Oct. 13, 1925.
P. KLINKHAMMER
EXTENSION HANDLE FOR GARDEN HOSE
Filed June 9, 1924
1,557,477
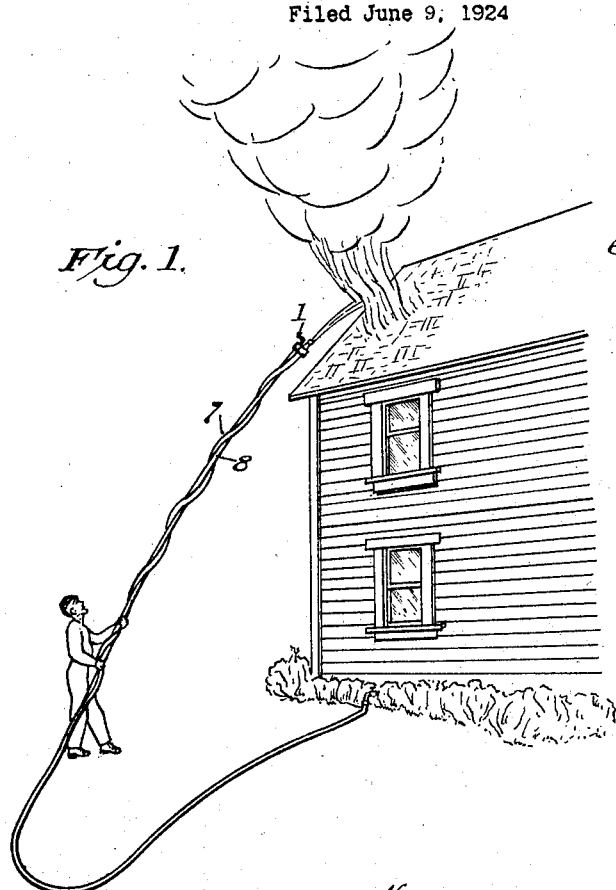
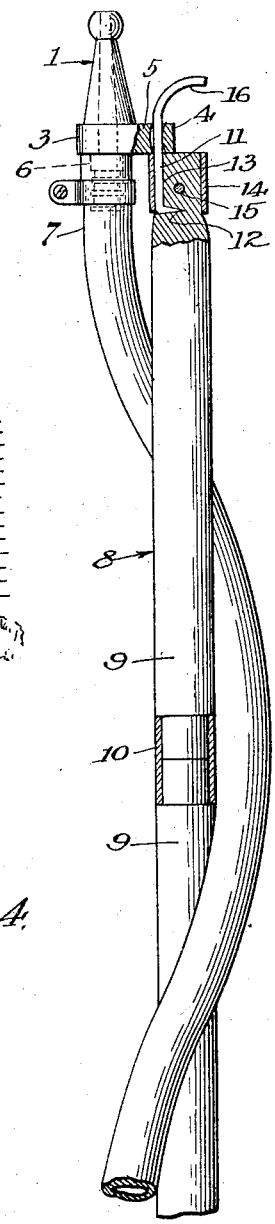
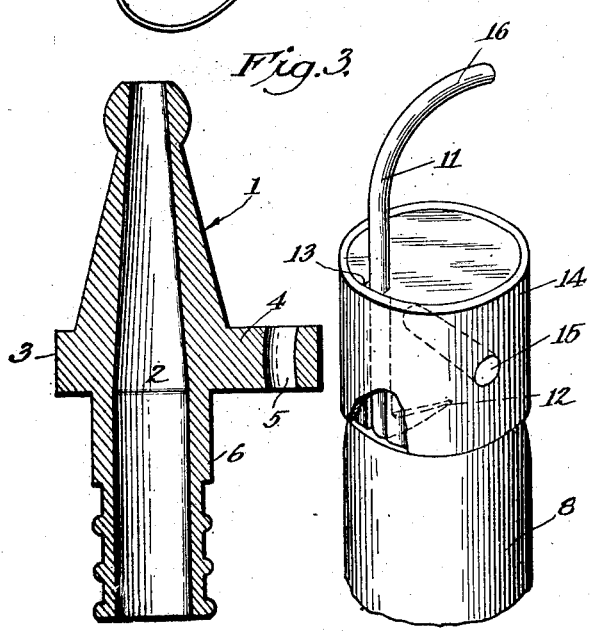
Inventor:
Peter Klinkhammer
By Hazard and Miller
Attorneys.

Patented Oct. 13, 1925.

1,557,477

UNITED STATES PATENT OFFICE.

PETER KLINKHAMMER, OF LOS ANGELES, CALIFORNIA.

EXTENSION HANDLE FOR GARDEN HOSE.

Application filed June 9, 1924. Serial No. 718,783.

*To all whom it may concern:*

Be it known that I, PETER KLINKHAMMER, a citizen of the United States, residing at Los Angeles, in the county of Los Angeles and State of California, have invented new and useful Improvements in Extension Handles for Garden Hose, of which the following is a specification.

This invention is an extension handle for garden hose and consists of the novel features herein shown, described and claimed.

An object is to provide means whereby an operator may handle and guide a garden hose or the like at a considerable distance, as when fighting a fire.

Other objects and advantages will appear from the drawings and specification.

The drawings illustrate the construction and operation of an extension handle for garden hose embodying the principles of my invention.

Figure 1 is a perspective illustrating the operation of fighting a fire on the roof of a house by an operator on the ground a considerable distance from the fire, and using the extension handle on a garden hose.

Fig. 2 is a sectional detail of the garden hose nozzle and extension handle, the parts being assembled for use.

Fig. 3 is a longitudinal diametrical sectional detail of the hose nozzle.

Fig. 4 is a perspective of the end of the extension handle and showing the prong construction for connecting the handle to the nozzle.

The details of the construction and operation shown in the drawings are as follows:

The nozzle 1 is a casting having a longitudinal bore 2 tapered at its discharge end. The head 3 is substantially at the longitudinal center of the nozzle and forms an annular band extended at one side to form material for the socket head 4 having an opening 5 substantially parallel with the bore 2. The nipple 6 extends downwardly from the head 3 and is adapted to be inserted into the end of a garden hose 7.

The extension handle 8 may be any sort of a pole, preferably built up of round sections 9 of suitable wood, the sections 9 being removably jointed together by ferrules or bands 10 so that the handle may be readily made up to any desired length. A substantial prong 11 is made of round rod and has a retaining barb 12 at one end. One section 9 has a groove 13 at its end, the groove extending longitudinally, and the prong is laid in the groove 13 and the barb 12 driven diametrically into the wood. A ferrule 14 is driven upon the end of the section 9 around the prong 11 and a pin 15 is inserted transversely through the ferrule and wood to hold the prong 11 securely in place. The outer end of the prong 11 is curved to more than a quarter of a circle to form the hook 16. The hook 16 extends in a plane across the plane of the axis of the section 9.

In the practical operation, the hook 16 is passed upwardly through the socket opening 5 and the hose 7 is wound more or less around the extension handle sections 9, the handle sections being connected together to produce a pole of the desired length and the hook 16 securely holds the nozzle 1 so that in the operation the nozzle cannot become disconnected from the extension handle.

It will be noted that the socket opening 5 in the socket head 4 of the nozzle, is curved so that it may be readily fitted on the curved part of the hook 16 of the prong 11 and that when it is in position for use as shown in Fig. 2, the ends of the concave side of the curve and the central portion of the convex side bind on the straight part of the prong and thereby hold it firmly in position.

Various changes may be made without departing from the spirit of my invention as claimed.

I claim:

1. An extension handle for hose, comprising in combination a pole, a prong secured to the end thereof having a curved hook end and a straight section in alinement with the pole, a hose nozzle having a socket head with a curved aperture therethrough adapted to have a loose fit with the curved hook and being of such size that the ends of the concave side of the aperture and the center portion of the convex side bind on the straight part of the prong.

2. An extension handle for hose, comprising a pole having a longitudinal groove in the periphery of its end, a prong fitting in the groove having a sharpened barb driven transversely into the pole at the end of the groove, a ferrule fitting on the end of the pole around the prong, the prong having a straight portion in alinement with the pole and a curved outer end in combination with a hose nozzle having a lug formed at one side with a curved aperture therein and adapted to conform loosely to the shape of the curved part of the prong and with such dimensions that the ends of the concave part of the aperture and the center portion of the convex side, bind on the straight portion of the prong.

In testimony whereof I have signed my name to this specification.

PETER KLINKHAMMER.